Sept. 13, 1932.  C. A. RICH  1,877,693
AUTOMATIC SCREW MACHINE
Filed Nov. 17, 1927  7 Sheets-Sheet 3

Fig. 4

Witness
Jas. J. Maloney

Inventor
Charles A. Rich
by Van Everen, Fish
Hildreth & Neary
Attys.

Sept. 13, 1932.   C. A. RICH   1,877,693
AUTOMATIC SCREW MACHINE
Filed Nov. 17, 1927   7 Sheets-Sheet 5

Sept. 13, 1932.  C. A. RICH  1,877,693
AUTOMATIC SCREW MACHINE
Filed Nov. 17, 1927   7 Sheets-Sheet 7

Patented Sept. 13, 1932

1,877,693

UNITED STATES PATENT OFFICE

CHARLES A. RICH, OF PROVIDENCE, RHODE ISLAND, ASSIGNOR TO BROWN AND SHARPE MANUFACTURING COMPANY, A CORPORATION OF RHODE ISLAND

AUTOMATIC SCREW MACHINE

Application filed November 17, 1927. Serial No. 233,753.

The present invention relates to screw and similar machines for fashioning articles successively from metal bar stock.

Machines of this type are provided with work engaging tools and with means for feeding a metal bar to present successive end portions to the tools. The stock used runs ten feet and upwards in length so that a comparatively large number of articles can be turned out in rapid succession before it becomes necessary to stop the machine and replace the waste end of the old bar by a new piece of stock. In operating these machines, the operator selects a bar, inserts and positions it in the feed mechanism and starts the machine. From this point, the machine operates automatically to produce the finished articles in rapid succession until the bar is exhausted, and then stops. But even when the machine is speeded up to the highest limit compatible with doing good work, and stock of as great length as it is feasible to employ is fed into the machine, the efficiency of the machine is still seriously limited by the fact that a comparatively large part of the working day is necessarily spent in idleness while the operator replaces the waste ends with new stock and again sets the machine in operation.

The primary object of the present invention, therefore, is to provide a simple and practicable means which will enable a machine of this type to be kept in operation a much greater percentage of the working day and thus greatly increase the production and efficiency of the machine.

With this object in view, one feature of the invention contemplates the provision of mechanism which operates automatically to insert in the feeding mechanism a new piece of stock to replace the old bar as it becomes exhausted.

Since it is believed to be new to provide means for automatically inserting and adjusting in operative position a piece of stock in a machine of this type, the invention in its broadest aspect is not to be limited to any particular structure or mode of operation. However, in the specific embodiment of the invention hereinafter described, certain valuable features are incorporated which result in making the machine completely automatic in operation, and thus still further increase the efficiency of the machine.

The features referred to comprise a magazine from which the required stock is selected, and a timing mechanism which acts automatically as the old bar becomes exhausted to stop the machine, throw into operation the mechanism for inserting a new piece of stock from the magazine in the machine, and finally set the machine again in operation.

In order to facilitate the handling of the long and rather flexible bars used, a guideway is provided in line with the feed-tube and directly beneath the magazine, so that the selected bar can be dropped onto the guideway and fed lengthwise directly into the machine.

Other features of the invention consists in the devices, combinations and arrangement of parts hereinafter described and claimed and together with the advantages to be obtained thereby, should be readily understood by one skilled in the art from the following description taken in connection with the accompanying drawings, in which

The invention is herein disclosed as embodied in an automatic screw machine or turret lathe of ordinary construction which is provided with a hollow rotating spindle 20, in which a piece of metal bar stock is firmly held and rotated, and with a turret and slides for holding the various work engaging tools. A feed tube is indicated at 24 for feeding the bar stock through the spindle to present successive end portions to the tools and has screwed to its inner end a feed collet 25 for gripping the bar of stock. A spring collet or chuck 26 is provided to clamp the bar rigidly with relation to the rotating spindle during the operations of the various tools in accordance with the usual practice in machines of this type. A swing stop lever 28 is pivotally mounted at 30 on the machine frame and is actuated to swing forward momentarily during each feeding operation to limit the forward movement of the bar and position the end accurately for the operation of the tools. The swing stop lever 28 is connected to a cam lever 34 by means of a link 32 which is pivotally secured at its lower end to the cam lever and at its upper end is provided with a rack which meshes with a pinion formed on the hub of the stop lever 34. The cam lever 34 carries a cam roll 36 adapted to ride on the periphery of a cam 38 secured to a shaft 40. The main driving shaft of the machine is indicated at 42 and is driven through clutch mechanism from the continuously rotating driving pulley 44.

The mechanisms for automatically placing a new bar of stock in the machine and for making the machine more completely automatic in operation, which form the subject matter of the present invention, comprise means for selecting and inserting a new piece of bar stock in the feed-tube, a magazine from which the bar is selected and a timing mechanism which is rendered active as the old bar becomes exhausted to cause the machine to stop while a new bar is automatically inserted in the machine and then to put the machine again in operation.

Figure 7:
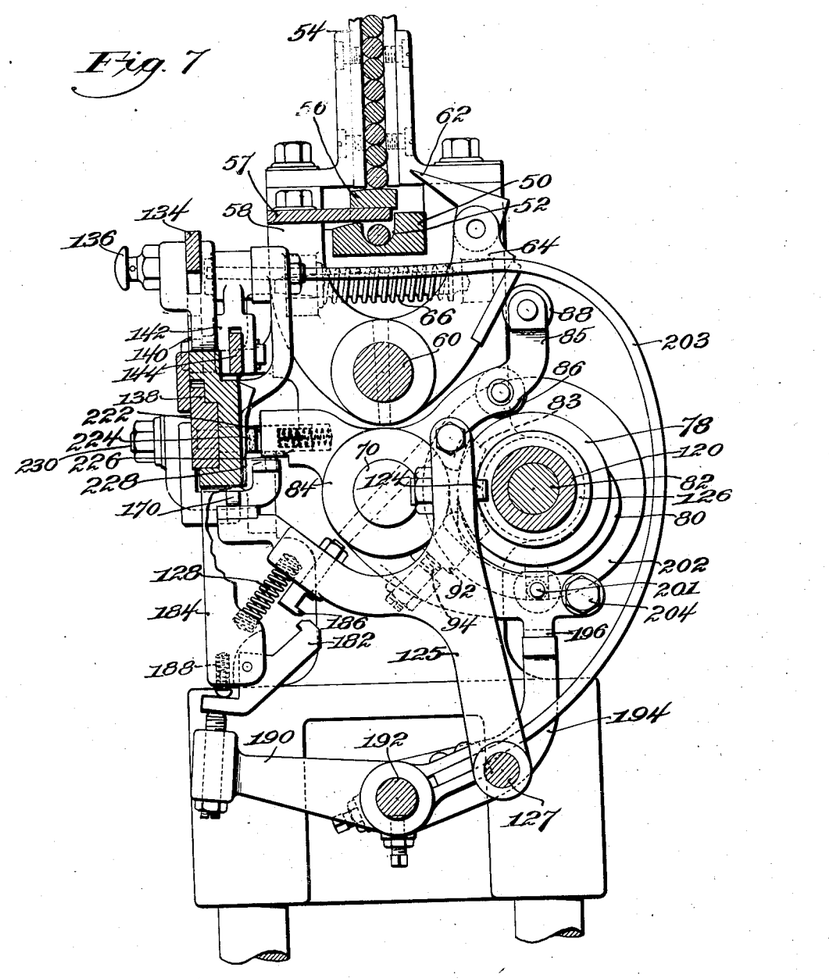
Fig. 7 is a sectional end view taken substantially on the line 7—7 of Fig. 1.

In order to permit new bars of stock to be fed automatically into the machine a guideway comprising a long supporting member 50 having a groove 52 adapted to receive a single piece of stock is provided in alignment with the feed-tube of the machine. The magazine is mounted directly above the supporting member 50 and comprises a series of narrow frames 54 for supporting the bar stock along its length which are adapted to hold a single series of bars one above the other. This column of reserve bars is supported by a long narrow plate 56 which normally closes the lower end of the magazine. The plate 56 is mounted on a flat bar 57 which is in turn secured to the corresponding arms 58 of a series of similar yokes 64 rigidly mounted on a rock shaft 60 beneath the supporting member 50, so that by rocking the shaft 60 to the left as viewed in Fig. 7, the plate 56 may be removed to permit a new bar to drop into the guideway 52. At the same time the flanges 62 formed on the remaining arms of the yokes 64 are inserted between the lowest bar and the remaining bars in the magazine to support the column when the plate 56 is removed to release the bottom bar. A compression spring 66, supported at one end by the machine frame and at the other end against one of the yokes 64, tends to rock the shaft 60 to the right as illustrated in Fig. 7 to close the magazine.

The new bar is moved along the guideway 52 into operating position in the spindle by means of a feed plunger 67 which is rigidly secured to an arm 68 on the feed slide bar 70 and is adapted to engage with the rear end of the new piece of bar stock. An arm 72 provided with a slot to receive the bar is mounted on the feed slide 70 adjacent to the arm 68 to insure that the end of the bar registers with the feed plunger 67.

The mechanism for rocking the shaft 60 against the pressure of the spring 66 to cause a piece of stock to be selected and dropped into the guideway 52 and for actuating the feed slide 70 to feed the bar into operating position in the machine comprises a spiral feed cam 78 for moving the feed slide 70 and a cam 80 for rocking the shaft which are mounted on a cam shaft 82 in the machine frame. The feed slide 70 is connected to move forward and then back again to starting position during the continued rotation of the shaft 82 by the engagement of a cam follower 83 on a bracket 84 secured to the feed slide 70 with the spiral cam 78.

The rock shaft 60 is actuated from the cam 80 by means of a cam lever 85 which is loosely mounted to rotate on the feed slide bar 70 and carries a cam roll 86 adapted to engage with the cam 80 and a second cam roll 88 to engage with one of the yokes 64. When the cam shaft 82 is rotated the roll 86 immediately rides on a high portion of the cam 80 causing the roll 88 to engage the yoke 64 and rock the shaft 60 to permit a new bar to be dropped into the guideway 52. A dwell is provided in the spiral cam 78 so that the feed slide 70 remains stationary until the new bar has been placed in the guideway, after which it moves forward to advance the bar into the feed tube 24. The cam rolls on the cam lever 85 which is mounted to move with the feed slide 70 now slide out of engagement with the yoke 64 and the cam 80 allowing the rock shaft 60 and the plate 56 to snap back to closed position under the pressure of the spring 66. The downward movement of the cam lever 85 is limited by the engagement of an abutment 92 on the lever with a stop 94 mounted on the feed slide 70.

The driving connections for rotating the cam shaft 82 to cause a new bar of stock to be selected from the magazine and fed into the machine comprise a sprocket wheel 100 which is mounted on a shaft 102 and meshes with the usual sprocket chain 104 for driving a water pump connected with the machine. The sprocket 100 and shaft 102 are continuously driven from the driving sprocket wheel 108 which is secured to the hub of the main driving pulley 44 of the machine. The shaft 102 is connected through the gears 112 and 114 to a stub shaft 116 which abuts the cam shaft 82 and carries a clutch member 118 which is adapted to engage with a corresponding clutch sleeve 120 keyed to slide on the cam shaft 82. The clutch sleeve 120 is normally held out of engagement with the member 118 against the pressure of compression springs 122 by the engagement of a latch pin 124 formed on one arm of a latch lever 125 with a cam groove 126 formed in the periphery of the sleeve. The latch lever 125 is pivoted at 127 on the machine frame and is yieldingly forced in a direction to engage the latch pin 124 with the groove 126 by means of a compression spring 128.

As the bar of stock which is being operated upon in the machine becomes exhausted, the machine is stopped, the mechanism for selecting and inserting a new bar in the machine is rendered operative to replace the waste end of the old bar with a fresh piece of stock, and the machine is finally set in motion again by means which include a drop lever 130, normally supported by the bar which is being operated upon in the machine, and actuating mechanisms more fully to be described, which are thrown into operation by the movement of the drop lever 130 as the end of the old bar passes from under it. The drop lever 130 is pivotally mounted at 132 on the machine frame to extend across the bar at the rear end of the feed-tube 24 and in turn supports one end of a lever 134 which extends at right angles to the drop lever 130 and is mounted on a fixed pivot 136.

Due to the fact that the drop lever 130 is situated at the rear end of the hollow spindle a considerable distance from the point where the tools are operating, and in order to utilize as much of the stock as possible, a timing mechanism is provided which is set in operation by the movement of the drop lever 130 and which acts only after the waste end of the bar has been reduced to the smallest possible dimension, to stop the machine and set in motion the mechanisms for selecting and inserting in the machine a new piece of stock.

The timing mechanism comprises a rack bar 138 which is given a step by step feeding movement in timed relation to the feeding movements imparted to the piece of stock in the machine by means of a pawl 140 which is pivoted to the lower end of a short vertically situated lever 142 and is given a continuous reciprocatory movement by means of a link 144 connected at one end to the lower end of the lever 142 and at its other end to the usual chuck lever 146 for clamping the stock to the spindle at the end of each feeding movement. The starting position of the rack bar 138 is carefully adjusted to cause a number of rack teeth to be acted upon by the pawl 140 exactly corresponding to the number of feeding movements required to exhaust the stock remaining in the machine, which varies with the length of the feeding movement imparted to the bar.

During the normal operation of the machine, the drop lever 130 and the forward end of the lever 134 are held in raised position, so that the rear end of the lever 134 is held in contact with the tailpiece 148 on the reciprocating pawl 140 to hold it out of contact with the rack bar 138. As the end of the bar being fed into the machine passes from under the drop lever 130, the drop lever 130 and the lever 134 are permitted to fall, thus raising the rear end of the lever 134 so that the pawl 140 can engage with and impart a step by step movement to the rack bar 138.

The rack bar is provided with a number of dogs which are adapted to come into contact with corresponding lever arms, first to hold the swing stop lever 28 out of operation, and then to disengage the machine clutch, and finally to throw into operation the mechanism for selecting and inserting a new piece of stock in the machine. A bracket 150 is secured to the forward end of the rack bar 138 and is provided with an adjustable dog 152 which engages a lever 154 when the pawl 140 has reached the last tooth on the rack bar 138. The lever 154 is secured to one end of a rock shaft 156 which also carries a lever arm 158 connected at its free end to one end of a thrust bar 160. When the contact point 152 comes in contact with the lever 154 to rock the shaft 156, the thrust bar 160 is moved under the cam lever 34 and holds the swing stop lever 28 in its retracted position.

Figure 1:
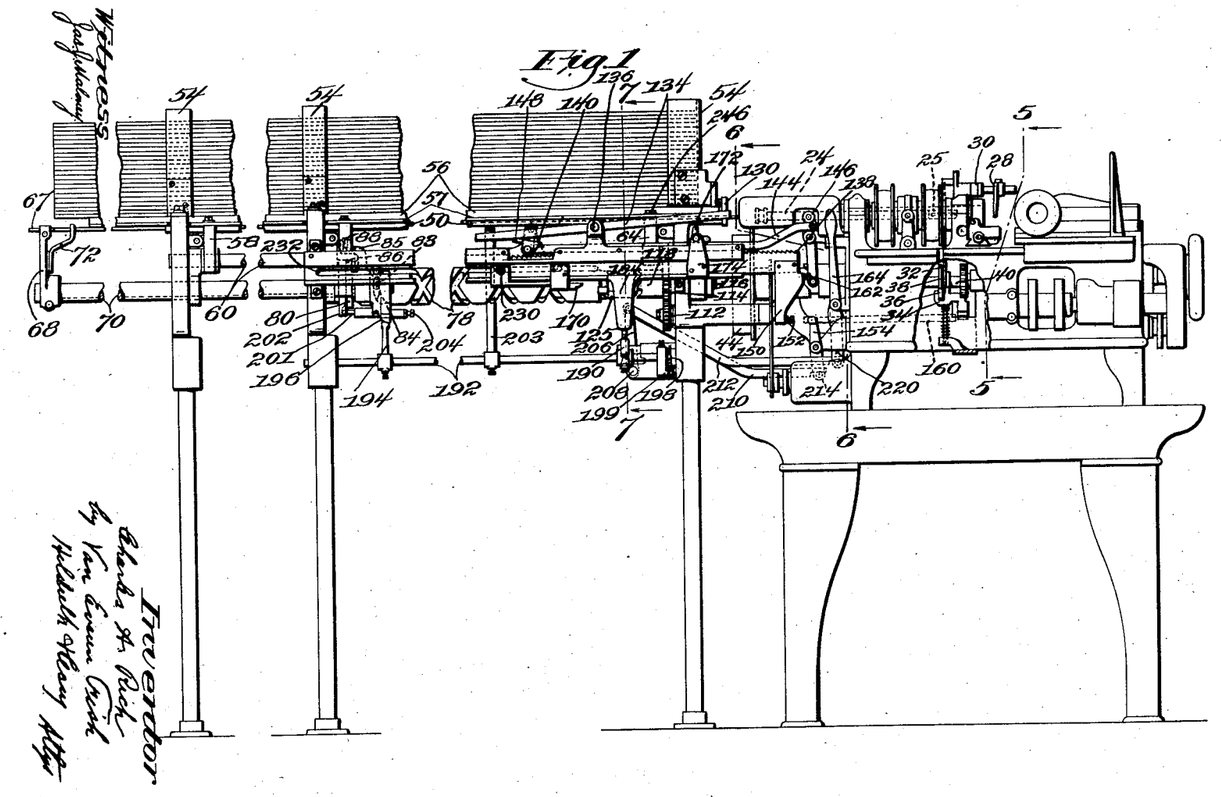
Fig. 1 is a view in side elevation of an automatic screw machine embodying the present invention.
Figure 2:
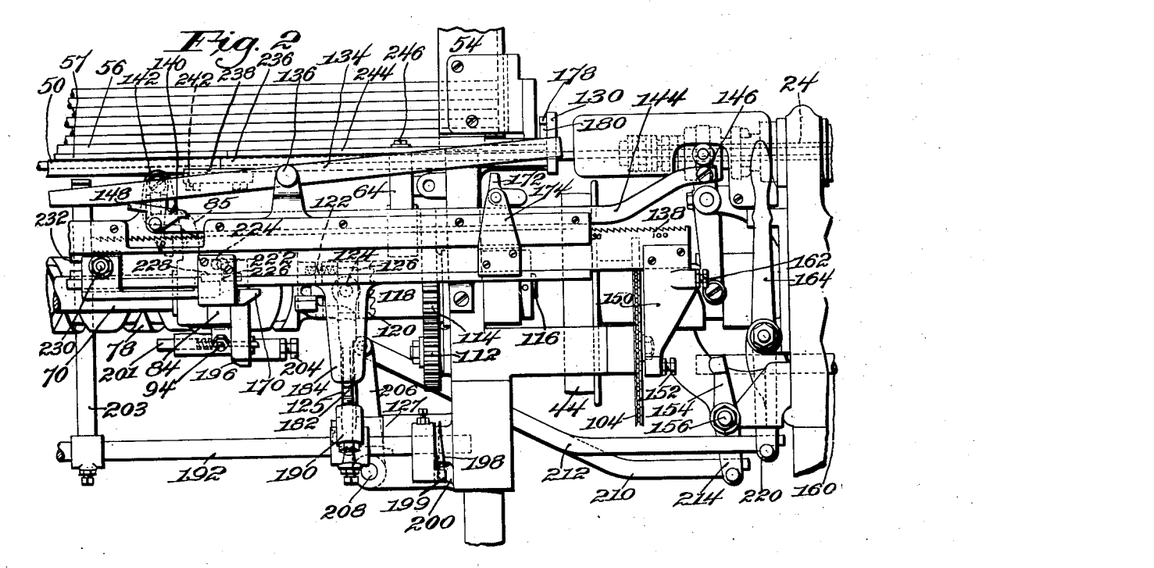
Fig. 2 is an enlarged view of certain of the parts shown in Fig. 1, illustrating particularly the timing mechanism and the driving connections for the mechanism for selecting and inserting a new piece of stock in the machine.
Figure 3:
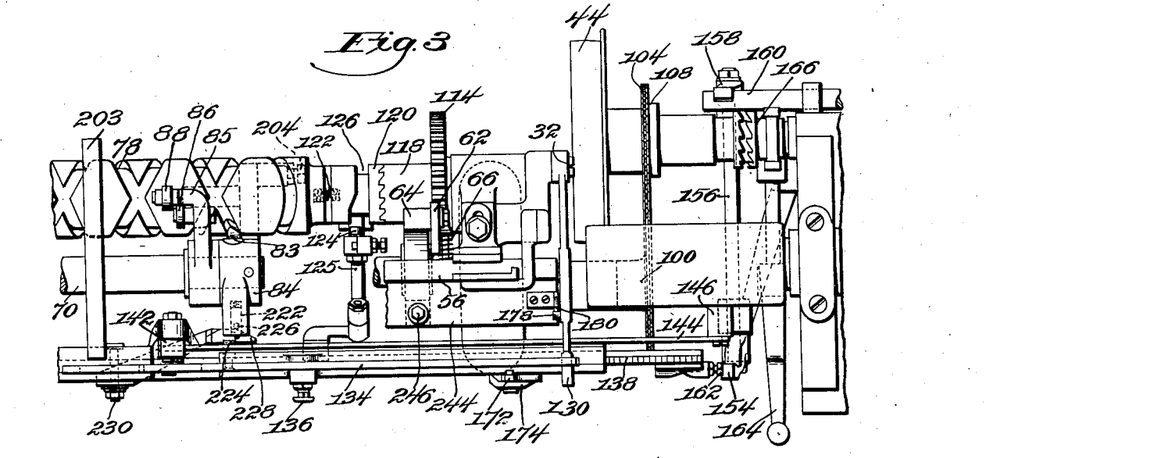
Fig. 3 is a plan view of the parts shown in Fig. 2.
Figure 4:
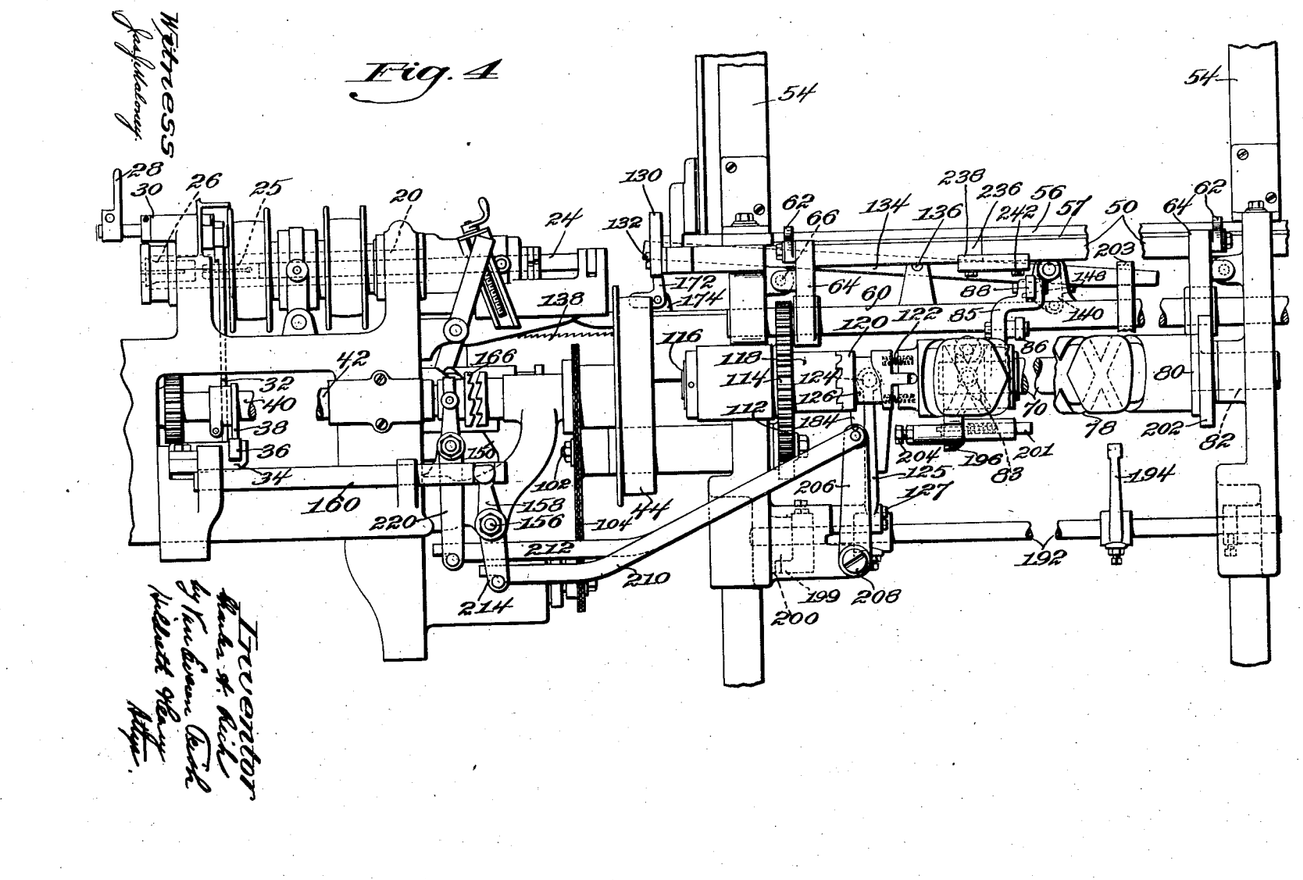
Fig. 4 is a view in side elevation taken from the rear of the parts illustrated in Figs. 2 and 3.
Figure 5:
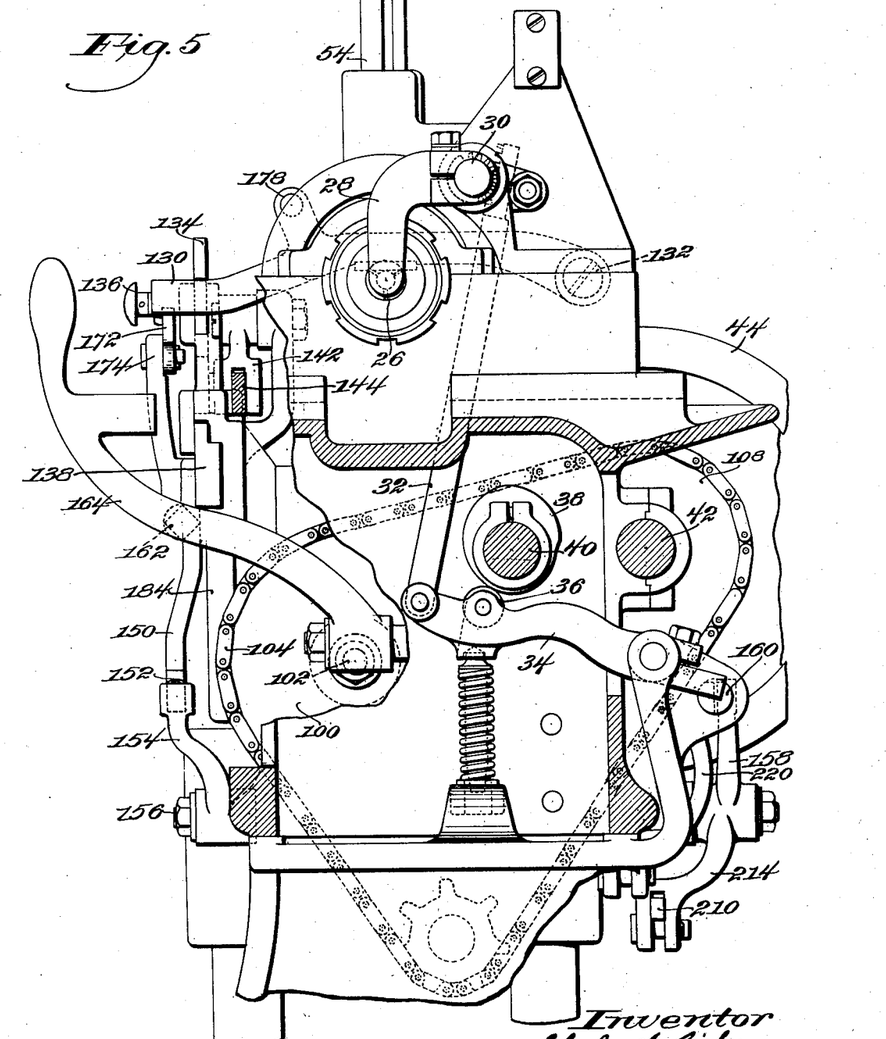
Fig. 5 is a sectional end view taken substantially on the line 5—5 of Fig. 1.
Figure 6:
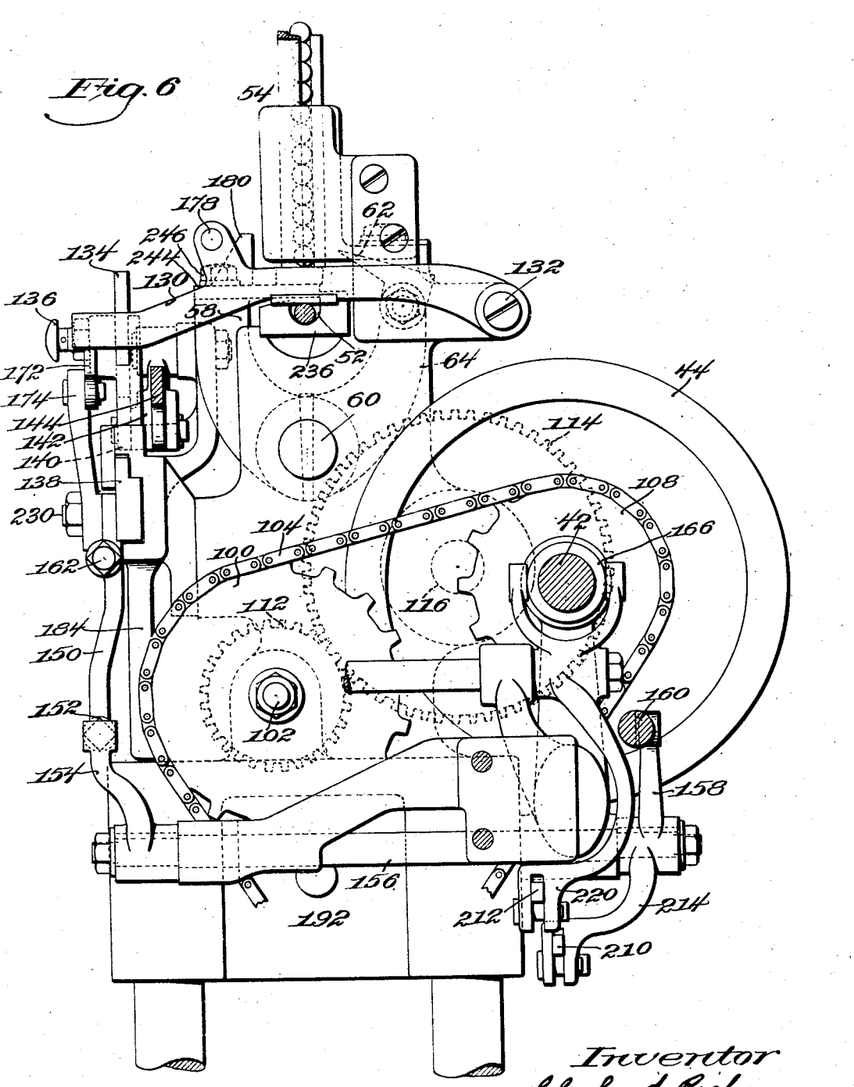
Fig. 6 is a sectional end view taken substantially on the line 6—6 of Fig. 1.

When the final feeding movement of the rack bar takes place also, an adjustable dog 162 formed on the bracket 150 comes in contact with and throws the starting and stopping lever 164 of the machine to the right, as viewed in Fig. 1, to throw out the machine clutch 166 to stop the machine.

At the same time that the starting and stopping lever 164 is thrown over to release the machine clutch, a cam shaped dog 170 comes into contact with and depresses the free arm of the latch lever 125 to withdraw the latch pin 124 and permit the clutch sleeve 120 to engage with the continuously rotating clutch member 118 to throw the mechanism for selecting and inserting a new piece of stock into operation. As the rack bar 138 comes to rest in its most advanced position, a small latch support 172 pivotally mounted on a bracket 174 on the rack bar 138 comes into position underneath the free end of the drop lever 130. The latch support 172 is balanced so that it tends to assume an upright position, but due to the low position of the drop lever 130, the latch strikes the drop lever and is tilted to one side.

The rotation of the cam shaft 82 causes the cams 78 and 80 to act as above described, first to rock the shaft 60 to select and drop a fresh piece of stock into the guideway, and thereafter to advance the feed slide 70. As the shaft 60 is rocked, a cam surface 180 formed on the bar 57 which as above described is mounted on the yokes 64 engages a pin 178 on a projecting arm of the drop lever 130 to return the drop lever 130 and the lever 134 to their raised positions. The latch support 172 is now permitted to assume an upright position to support the drop lever 130 when the shaft 60 rocks back to its original position.

As the feed slide 70 is advanced to move the new bar into the spindle, mechanism is rendered operative to maintain the latch lever 125 and latch pin 124 out of engagement with the clutch sleeve 120 until the feed slide 70 has returned to rest position. This mechanism comprises a latch 182 which is pivoted on the fixed bracket 184 and is yieldingly pressed into engagement with a latch 186 on the latch lever 125 by means of a compression spring 188. In the rest position of the feed slide 70, the latch 182 is held in retracted position out of the path of the latch 186 by means of a lever arm 190 secured to a rock shaft 192 mounted on the machine frame beneath the feed slide 70 and held in contact with the latch 182 by the engagement of a second lever arm 194 on the rock shaft with a cam shaped member 196 secured to the bracket 84 on the feed slide 70. The advancing movement of the slide 70 to feed a new bar into the machine causes the cam member 196 to move out of contact with the arm 194 and permits the rock shaft 192 and lever arm 190 to rotate under the influence of a torsion spring 198 illustrated in Fig. 1 in a direction to release the latch 182 and lock the latch lever 125 in retracted position. The movement of the rock shaft 192 is limited by the engagement of an abutment 199 on the shaft with a positive stop 200 on the machine frame. At the end of the feeding and return movement of the feed slide 70 caused by the rotation of the spiral cam 78, the cam member 196 on the bracket 84 again engages the arm 194 to rock the shaft 192 and lever arm 190 into contact with the latch 182, to release the latch lever 125 and latch pin 124 which in turn engages the cam groove 126 in the clutch sleeve 120 to disconnect the cam shaft 82 from its driving mechanism. Mechanism for returning the cam shaft 82 exactly to its starting position comprises a spring plunger 201 seated in the bracket 84 on the feed slide 70 which is adapted to engage a recess formed in a disk 202 on the cam shaft 82 as the feed slide 70 reaches the end of its retracting movement.

A hook shaped lever 203 is secured to the rock shaft 192 and is adapted while the shaft is rocked to the left as viewed in Fig. 7, during the forward and return movement of the feed slide 70, to bear down upon the rear end of the lever 134 so that the pawl 140 is held securely out of engagement with the rack bar 138 during the return movement of the rack bar 138 to its original starting position. The hook shaped lever 203 thus acts as a safety device always to hold the pawl out of engagement with the rack bar 138 during the retracting movement of the rack bar after the latch support 172 has been withdrawn from beneath the drop lever 130, as for instance, where the machine is continued in operation after the supply of new stock is exhausted and no new bar is being fed into the machine.

Mechanism is also provided which is actuated by the feeding movement of the feed slide 70 after a new piece of stock has been placed in the spindle to release the swing stop lever 28 and to engage the machine clutch so that the machine is automatically put in operation. This mechanism comprises an adjustable dog 204 secured to the feed slide 70 which is adapted to engage and rock a lever 206 at the extreme forward limit of the movement of the feed slide 70. The lever 206 is pivotally mounted at 208 on the machine frame and is connected at its free end to the corresponding ends of the two push bars 210 and 212. The movement of the lever 206 acts through the push bar 210 and a lever arm 214 secured to the rock shaft 156, to rock the shaft and cause the trust bar 160 to be withdrawn from under the cam lever 34 to permit the swing stop lever 28 to be returned to active operation. The push bar 212 is connected at its free end to a lever arm 220 on the rock shaft to which the starting and stopping lever 164 is secured, so that this lever is at the same time rocked to engage the machine clutch.

The rack bar 138 of the timing mechanism is returned to starting position during the return movement of the feed slide 70 by the engagement of a spring plunger 222 seated in an arm of the bracket 84, secured to the slide 70 with a corresponding lug 224 formed on the rack bar 138. The spring plunger 222 is beveled on one side so that during the forward movement of the feed slide 70, the plunger 222 rides yieldingly over the lug 224 but upon the return movement of the slide 70, engages the lug to retract the rack bar 138.

The position to which the rack bar is returned is determined in accordance with the requirements of the work to cause a number of rack teeth to be acted upon by the pawl exactly corresponding to the number of feeding movements necessary to exhaust the bar after the drop lever 134 is released to throw the pawl 140 of the timing mechanism into operation. For this purpose, a pin 226 is mounted in the under side of the spring plunger 222 and is adapted to engage a trip plate 228 which causes the plunger 222 to move back out of engagement with the lug 224 to discontinue the retracting movement of the rack bar. The trip plate 228 is adjustably secured in position to bring the rack bar back to the desired starting position by means of a clamping bolt 230 which extends through a slot 232 formed in the machine frame. Calibrations are provided on the rack bar and a registering mark on the machine frame to facilitate the setting of the trip plate 228 by the operator.

Figure 8:
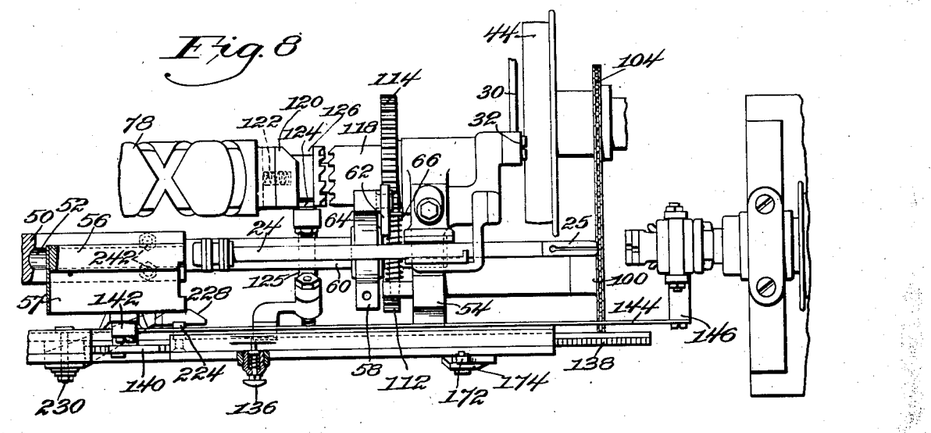
Figs. 8 to 11 are detail views illustrating particularly the method of removing the feed-tube from the machine, Fig. 8 being a detail plan view with the removable sections of the guideway and the member for closing the lower end of the magazine taken away and the feed-tube withdrawn from the spindle, Fig. 9 being a detail plan view of the removable section of the guideway, Fig. 10 being a detail plan view of the removable section of the member for closing the lower end of the magazine, and Fig. 11 being a side elevation of the parts as shown in Fig. 8.
Figure 9:
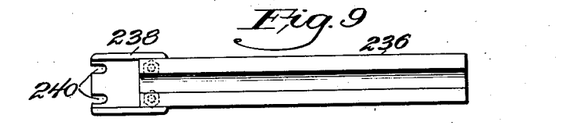
Figure 10:
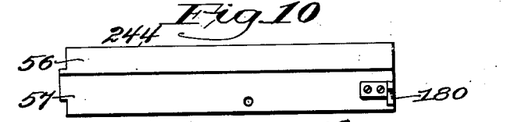
Figure 11:
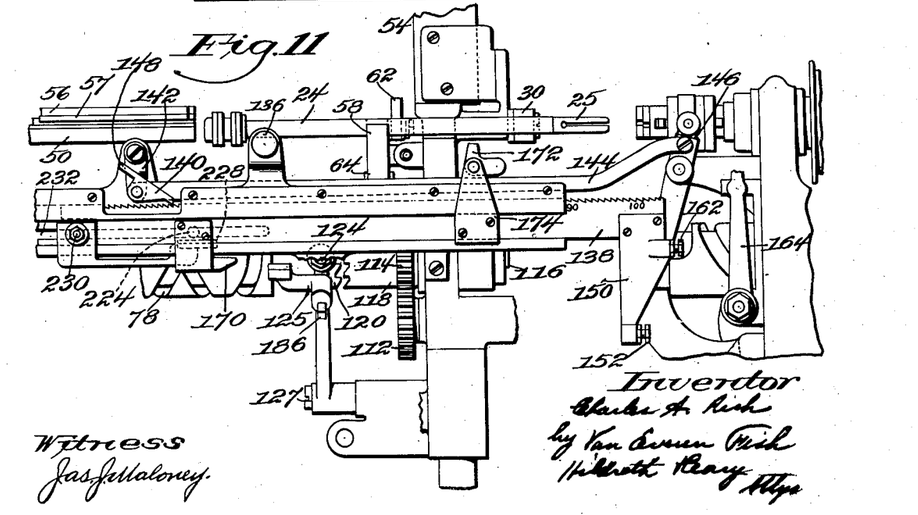

In setting up machines of this type to receive stock of different sizes and shapes it is necessary to remove the feed-tube 24 from the machine and replace the feed collet, carrying the feed fingers with a tool which is adapted to grip the particular stock being fed into the machine. To permit this to be done with the construction herein illustrated, the guideway 50, and the plate 56 at the bottom of the magazine with its supporting bar 57, are constructed with removable sections. The removable section of the guideway 50 is indicated at 236 (see Fig. 9). A cleat 238 is secured to the rear end of this section and is provided with slots 240 which receive clamping bolts 242 in the fixed portion of the guideway. At its forward end adjacent to the spindle, the section 236 is seated in a fixed portion of the machine frame. The removable section of the plate 56 and bar 57 is indicated at 244 (see Fig. 10). This section rests upon the upper end of the arm 58 of one of the yokes 64 and is held rigidly in position by a removable bolt 246. When the sections 236 and 244 are removed, a free space is provided to permit the removal of the feed-tube 24 from the spindle, as indicated in Figs. 8 and 11. To still further facilitate the removal of the feed-tube, the pivot 136 for the lever 134 is constructed in the form of a spring pin as best shown in Fig. 8, so that by withdrawing the pin, this lever can also be removed from the machine.

The operation of the machine briefly stated is as follows:—As the bar of stock in the machine nears exhaustion, the end of the bar passes from under the drop lever 130 which falls permitting the lever 134 to turn about its pivot so that the pawl 140 of the timing mechanism engages the rack bar 138 which is now given a step by step movement in timed relation to the feeding movements imparted to the bar of stock in the machine. Upon the last feeding movement of the rack bar 138, the dog 152 engages the lever 154, causing the swing stop lever 28 to be held in retracted position. When this final feeding movement of the rack bar takes place, the dog 162 acts to throw the starting and stopping lever 164 of the machine to disengage the machine clutch and stop the machine. At the same time, the dog 170 engages the latch lever 125 to release the clutch sleeve 120 and cause the mechanism for selecting and inserting a new piece of stock into the machine to be thrown into operation. The rack bar 138 remains in the position to which it was advanced by the engagement of the pawl 140 with the last tooth in the rack bar until it is returned to its original position after the machine is again in operation. The rotation of the cam shaft 82 of the bar selecting and inserting mechanism acting through the spiral feed cam 78 and the cam 80, first actuates the rock shaft 60 carrying the yokes 64 and the plate 56 to permit a new piece of stock to be selected and dropped into the guideway groove 52, and thereafter causes the feed slide 70 to be advanced to insert the new bar in the machine, at the same time forcing the waste end of the old bar out of the forward end of the spindle. The rocking of the shaft 60 causes the drop lever 130 to be raised to permit the inserting of the new bar, and also to render the continuously oscillating pawl 140 inoperative. The drop lever 130 is held in raised position until after a new piece of stock has been moved into position by means of the small latch support 172 mounted on the rack bar 138 which as previously pointed out is held in its advanced position until after the machine is again in operation. As the feed slide 70 reaches the limit of its advancing movement, the dog 204 engages the lever 206 which acts through the connections above described to release the swing stop lever 28 and engage the machine clutch. The continued rotation of the spiral cam 78 causes the feed slide 70 to be finally returned to starting position when the cam 196 engages the arm 194 to release the latch lever 125 and latch pin 124, causing the clutch sleeve 120 to be moved out of engagement with the continuously rotating clutch member 118 to stop the cam shaft 82. During the return movement of the feed slide 70, the spring plunger 222 on the feed slide engages the lug 224 secured to the rack bar 138 and causes the rack bar to be retracted until the spring plunger is withdrawn from the lug by the adjustable trip plate 228 so that the rack bar is reset at the desired starting position.

The invention having been thus described, what is claimed is:

1. A machine for fashioning articles successively from bar stock having, in combination, means for feeding a bar to present successive portions to the work engaging tools, and mechanism controlled from the old bar acting automatically to place a new bar in the machine timed to operate only upon exhaustion of the old bar.

2. A machine for fashioning articles successively from bar stock having, in combination, means for feeding a bar to present successive portions to the work engaging tools, mechanism for rotating the bar while engaged by the tools, a magazine for storing additional stock, and mechanism acting automatically when rendered active to place a new bar in the machine from the magazine timed to operate only upon exhaustion of the old bar.

3. A machine for fashioning articles successively from bar stock having, in combination, mechanism for feeding the bar to present successive portions to the work engaging tools, mechanism for rotating the bar while engaged by the tools, a magazine for storing additional stock, a work rest constructed to support the bar along its length in line with the spindle while rotating, and means for automatically separating a new piece of stock from the supply in the magazine and placing on the work rest said new piece of stock.

4. A machine for fashioning articles successively from bar stock having, in combination, mechanism for feeding the bar to present successive portions to the work engaging tools, a magazine for storing additional stock, and means controlled from the old bar for automatically selecting from the magazine and placing in the feed mechanism a new piece of stock timed to operate only upon exhaustion of the old bar.

5. A machine for fashioning articles successively from bar stock having, in combination, feeding mechanism for feeding a bar to present successive portions to the work engaging tools, mechanism for rotating the bar while engaged by the tools, means for supporting the rotating bar along its length on the axis of rotation of the bar, and mechanism acting when rendered active to move a new bar of stock endwise into position to be engaged by the feeding mechanism.

6. A machine for fashioning articles successively from bar stock having, in combination, feeding mechanism for feeding a bar to present successive portions to the work engaging tools, and mechanism controlled from the old bar acting automatically and timed to operate only upon the exhaustion of the old bar to move a new bar of stock endwise into position to be engaged by the feeding mechanism.

7. A machine for fashioning articles successively from bar stock having, in combination, a feed-tube through which a bar is fed to present successive portions to the work engaging tools, actuating mechanism for the feed-tube, and mechanism controlled from the old bar acting automatically and timed to operate only upon exhaustion of the old bar to place a new bar in the feed-tube.

8. A machine for fashioning articles successively from bar stock having, in combination, a reciprocating feed-tube through which a bar is fed to present successive portions to the work engaging tools, actuating mechanism for the feed-tube, a magazine for storing additional stock, and means for automatically placing a new bar in the feed-tube from the magazine timed to operate only upon exhaustion of the old bar.

9. A machine for fashioning articles successively from bar stock having, in combination, actuating mechanism therefor, a reciprocating feed-tube through which a bar is fed to present successive portions to the work engaging tools, actuating mechanism for the tube, a magazine for storing additional stock, and mechanism rendered active by and timed to operate only upon the exhaustion of the old bar to insert a new bar from the magazine in the feed-tube.

10. A machine for fashioning articles successively from bar stock having, in combination, actuating mechanism therefor, means for feeding a bar to present successive portions to the work engaging tools, a magazine for storing additional stock, mechanism for automatically selecting from the magazine and presenting to the feeding means a new piece of stock, and a feeler mechanism actuated by the passing of the end of the old bar to cause the selecting mechanism to insert a new bar in the machine only after the old bar has been exhausted.

11. A machine for fashioning articles successively from bar stock having, in combination, means for feeding bar stock to present successive portions to the work engaging tools, a magazine for storing additional stock, mechanism for selecting and inserting in the feed mechanism a new piece of stock, a feeler mechanism for detecting the exhaustion of the bar, and mechanism controlled by the feeler mechanism acting when thrown into operation to stop the machine, to cause the selecting mechanism to place a new piece of stock in the machine, and finally to start the machine again into operation.

12. A machine for fashioning articles successively from bar stock having, in combination, a reciprocating feed-tube through which a bar is fed to present successive portions to the work engaging tools, actuating mechanism for the tube, mechanism for rotating the bar while engaged by the tools, supports in line with the feed-tube, a magazine for storing additional stock, mechanism for selecting and placing on the supports a bar from the magazine, and means for moving the bar lengthwise on the supports into the feed-tube to replace the waste end of a bar.

13. A machine for fashioning articles successively from bar stock having, in combination, means for feeding bar stock to present successive portions to the work engaging tools, a main driving clutch, a magazine for storing additional stock, mechanism for selecting from the magazine and inserting in the feed mechanism a new piece of stock, and mechanism rendered active upon exhaustion of a bar to disengage the driving clutch and to cause the mechanism to select and insert a new bar in the feed mechanism and thereafter to reengage the driving clutch.

14. A machine for fashioning articles successively from bar stock having, in combination, a feed-tube for feeding bar stock to present successive portions to the work engaging tools, actuating mechanism for the feed-tube, a main driving clutch, a magazine for storing additional stock, mechanism for selecting from the magazine and inserting in the feed-tube a new piece of stock, mechanism rendered active upon exhaustion of a bar to disengage the clutch, and to cause the mechanism to select and insert a new bar in the feed-tube, and thereafter to reengage the clutch.

15. A machine for fashioning articles successively from bar stock having, in combination, a feed-tube for feeding bar stock to present successive portions to the work engaging tools, a main driving clutch, supports arranged to support a bar in alignment with the feed-tube, a magazine for storing additional stock, means for selecting and placing on the supports a bar from the magazine, means for moving the bar lengthwise into the feed-tube, a clutch through which the means for selecting and moving a bar into the feed-tube are driven, and means rendered operative upon the exhaustion of a piece of stock to disengage the main clutch and engage the clutch for the bar selecting and inserting mechanism to place a new bar in the feed-tube and thereafter to reengage the main clutch and disengage the clutch for the bar selecting and inserting mechanism.

16. A machine for fashioning articles successively from bar stock having, in combination, means for feeding bar stock to present successive portions to the work engaging tools, a magazine for storing additional stock, mechanism for selecting and inserting in the feed mechanism a new piece of stock, a rack bar, a pawl oscillated in timed relation to the movements of the stock feeding means, means acting normally to hold the pawl out of engagement with the rack bar, and means rendered operative by the exhaustion of a piece of stock to release the pawl and advance the rack bar to cause the bar selecting and inserting mechanism to place a new piece of stock in the machine.

17. A machine for fashioning articles successively from bar stock having, in combination, means for feeding a bar to present successive end portions to the work engaging tools, a trip mechanism rendered operative by the passing of the end of the bar, means for automatically placing a new piece of stock in the machine, and a timing mechanism actuated by the trip mechanism to cause a new piece of stock to be placed in the machine by said means when the old bar becomes exhausted.

18. A machine for fashioning articles successively from bar stock having, in combination, means for feeding a bar to present successive end portions to the work-engaging tools, a drop lever supported by the bar, means for automatically placing a new piece of stock in the machine, and a timing mechanism controlled by the drop lever and acting in timed relation to the feeding movements imparted to the bar to cause a new piece of stock to be placed in the machine by said means when the old bar becomes exhausted.

19. A machine for fashioning articles successively from bar stock having, in combination, means for feeding a bar to present successive end portions to the work engaging tools, a drop lever supported by the bar, means for placing a new piece of stock in the machine, a timing mechanism controlled by the drop lever to cause a new piece of stock to be placed in the machine by said means when the old bar becomes exhausted, said mechanism comprising a rack bar movable to throw said means into operation upon exhaustion of the bar, a pawl continuously oscillated in timed relation to the feeding movement imparted to the bar of stock, and means actuated by the drop lever to cause the pawl to engage the rack bar and impart a step by step feeding movement thereto.

20. A machine for fashioning articles successively from bar stock having, in combination, a hollow spindle including a feed-tube for feeding a bar to present successive end portions to the work engaging tools, a guideway in alignment with the feed-tube, a feed slide having a feeding and return movement for moving a new piece of stock on the guideway into the spindle, a trip mechanism rendered operative by the passing of the end of the bar, a rack bar movable to cause the feed slide to act to place a new piece of stock in the machine, a pawl continuously oscillated in timed relation to the feeding movement imparted to the bar to impart a step by step feeding movement to the rack bar, means for holding the pawl out of engagement with the rack bar actuated by the drop lever to release the pawl, and means rendered active during the return movement of the feed slide to move the rack bar back to starting position.

21. A machine for fashioning articles successively from bar stock having, in combination, a hollow spindle including a feed-tube for feeding a bar to present successive end portions to the work engaging tools, a guideway in alignment with the feed-tube, means having a feeding and return movement for placing a new piece of stock from the guideway in the spindle, a trip mechanism rendered operative by the passing of the end of the bar, a rack bar movable to cause a new piece of stock to be placed in the machine by said means, a pawl continuously oscillated in timed relation to the feeding movements imparted to the bar to impart a step by step feeding movement to the rack bar, means for holding the pawl out of engagement with the rack bar actuated by the trip mechanism to release the pawl, and mechanism rendered active during the return movement of the means for placing a new piece of stock in the machine to return the rack bar to starting position.

22. A machine for fashioning articles successively from bar stock having, in combination, a hollow spindle including a feed-tube for feeding a bar to present successive end portions to the work engaging tools, a guideway in alignment with the feed-tube, a feed slide for feeding a new piece of stock from the guideway into the spindle, a spiral cam for imparting to the feed slide a feeding and return movement, driving connections therefor, a trip mechanism rendered operative by the passing of the end of the bar, and a timing mechanism actuated by the trip mechanism to connect the spiral cam to its driving connections to cause a new piece of stock to be placed in the machine when the old bar becomes exhausted.

23. A machine for fashioning articles successively from bar stock having, in combination, a hollow spindle including a feed-tube for feeding a bar to present successive end portions to the work engaging tools, a guideway in alignment with the feed-tube, a feed slide having a feeding and return movement for moving a new piece of stock on the guideway into the spindle, a trip mechanism rendered operative by the passing of the end of the bar, a rack bar movable to cause the feed slide to act to place a new piece of stock in the machine, a pawl rendered operative by the trip mechanism to impart a step by step movement to the rack bar, a latch mechanism for causing the rack bar to be moved with the feed slide on the returning movement of the latter, and adjustable means for disengaging the latch to stop the rack bar in starting position.

24. A machine for fashioning articles successively from bar stock having, in combination, a hollow spindle including a feed-tube for feeding a bar to present successive end portions to the work engaging tools, a guideway in alignment with the feed-tube, a feed slide for feeding a new piece of stock from the guideway into the spindle, a spiral cam for imparting to the feed slide a feeding and return movement, driving connections therefor, a clutch for engaging the spiral cam with its driving connections, a trip mechanism rendered operative by the passing of the end of the bar, a timing mechanism actuated by the trip mechanism to engage the clutch to cause the feed slide to act to place a new piece of stock in the machine when the old bar becomes exhausted, and means for disengaging the clutch during the return movement of the feed slide to stop the spiral cam with the feed slide in starting position.

25. A machine for fashioning articles successively from bar stock having, in combination, a hollow spindle including a feed-tube for feeding a bar to present successive end portions to the work engaging tools, a guideway in alignment with the feed-tube, a feed slide having a feeding and return movement for moving a new piece of stock on the guideway into the spindle, a trip mechanism rendered operative by the passing of the end of the bar, a rack bar movable to cause the feed slide to act to place a new piece of stock in the machine, a pawl rendered operative by the trip mechanism for advancing the rack bar for each feeding movement imparted to the bar stock, a latch mechanism for retracting the rack bar with the feed slide upon the return movement of the latter, and means for disengaging the latch mechanism to stop the rack bar adjustable to cause the pawl to act upon a number of rack teeth which exactly corresponds to the number of feeding movements necessary to exhaust the bar after the operation of the trip mechanism.

26. A machine for fashioning articles successively from bar stock having, in combination, means for feeding a bar to present successive end portions to the work engaging tools, a trip mechanism rendered operative by the passing of the end of the bar, means for placing a new piece of stock in the machine, a pawl continuously oscillated in timed relation to the feeding movement imparted to the bar, a rack bar to which a step by step movement is imparted by the pawl, means for holding the pawl out of engagement with the rack bar actuated by the trip mechanism to release the pawl, and means for positioning the rack bar to cause the pawl to act upon a number of teeth which will exactly correspond to the number of feeding movements required to exhaust the bar after the operation of the trip mechanism.

27. A machine for fashioning articles successively from bar stock having, in combination, a hollow spindle including a feed-tube through which a bar is fed to present successive end portions to the work engaging tools, a guideway in alignment with the feed-tube, and means for moving a piece of stock along the guideway into the feed-tube, said guideway having a section removable to permit the removal of the feed-tube endwise from the rear end of the spindle.

28. A machine for fashioning articles successively from bar stock having, in combination, a hollow spindle including a feed-tube for feeding a bar of stock to present successive portions to the work engaging tools, a guideway in alignment with the feed-tube, a magazine for storing additional stock mounted above the guideway, a plurality of yokes having arms extending on opposite sides of the guideway, a closure for the bottom of the magazine mounted on corresponding arms of the yokes to move with the yokes to and from closing position above the guideway, supports carried by the remaining arms of the yokes arranged to project between the two bottom bars as the closure moves away from closing position, and means for moving the yokes to select and drop a bar into the guideway.

29. A machine for fashioning articles successively from bar stock having, in combination, a hollow spindle including a feed-tube for feeding a bar of stock to present successive portions to the work engaging tools, a guideway in alignment with the feed-tube, a magazine for storing additional stock mounted above the guideway, a rock shaft mounted beneath the guideway, a plurality of yokes secured to the rock shaft, a closure for the bottom of the magazine mounted upon corresponding arms of the yokes to move with the yokes to and from closing position above the guideway, supports carried by the remaining arms of the yokes arranged to project between the two bottom bars as the closure moves away from closing position, and means for rocking the shaft.

30. A machine for fashioning articles successively from bar stock having, in combination, a hollow spindle including a feed-tube for feeding a bar of stock to present successive portions to the work engaging tools, a guideway in alignment with the feed-tube, a magazine for storing a single column of bars directly above the guideway, a rock shaft mounted beneath the guideway, a plurality of yokes secured to the rock shaft, a plate for closing the lower end of the magazine secured to corresponding arms of the yokes, flanges formed on the remaining arms of the yokes adapted upon rocking the shaft to project between the two bottom bars, means for rocking the shaft to select and drop a bar into the guideway, and means for moving the bar along the guideway into the spindle.

31. A machine for fashioning articles successively from bar stock having, in combination, means for feeding bar stock to present successive portions to the work engaging tools, a stock stop against which the bar is fed, means for moving the stock stop into operating position during each feeding movement of the bar to position the end portion with relation to the tools, mechanism acting when rendered operative to move a new bar of stock endwise into position to be engaged by the feeding mechanism, and mechanism rendered active upon the exhaustion of a bar to stop the machine with the stock stop out of position to permit the ejection of the waste end and the feeding of a new bar into the machine.

32. A machine for fashioning articles successively from bar stock having, in combination, a hollow spindle through which a bar is fed to present successive end portions to the work engaging tools, a stock stop, means for moving the stop into operating position during each feeding movement of the bar to position the end portion with relation to the tools, means for inserting a new bar into the spindle, and a feeler mechanism actuated upon the exhaustion of a bar to stop the machine with the stock stop out of position, and then to cause the bar inserting mechanism to insert a new bar into the spindle and eject the waste end of the old bar.

33. A machine for fashioning articles successively from bar stock having, in combination, a hollow spindle through which a bar is fed to present successive end portions to the work engaging tools, a stock stop, means for moving the stop into operating position during each feeding movement of the bar to position the end portion with relation to the tools, means for inserting a new bar into the spindle, mechanism actuated upon the exhaustion of the bar to hold the stock stop out of position, cause the bar inserting mechanism to insert a new bar into the spindle and eject the waste end of the old bar, and return the stock stop to operative position.

34. A machine for fashioning articles successively from bar stock having, in combination, a hollow spindle through which a bar is fed to present successive end portions to the work engaging tools, a stock stop, means for moving the stop into operating position during each feeding movement of the bar to position the end portion with relation to the tools, a guideway in alignment with the spindle, a feed slide having a forward and return movement to move a new piece of stock along the guideway into the spindle, mechanism rendered active upon the exhaustion of a bar to stop the machine with the stock stop out of position to permit the feeding of a new bar into the machine and the ejection of the waste end of the old bar, and means actuated by the advancing movement of the feed slide to return the stock stop to operative position.

35. A machine for fashioning articles successively from bar stock having, in combination, a hollow spindle through which a bar is fed to present successive end portions to the work engaging tools, a stock stop, means for moving the stop into operating position during each feeding movement of the bar to position the end portion with relation to the tools, a guideway in alignment with the spindle, a feed slide having a forward and return movement to move a new piece of stock along the guideway into the spindle, a lock bolt for holding the stock stop out of operating position, mechanism rendered active upon the exhaustion of a bar to actuate the lock bolt to hold the stock stop out of operating position, and means actuated by the advancing movement of the feed slide to withdraw the lock bolt.

36. A machine for fashioning articles successively from bar stock having, in combination, a hollow spindle through which a bar is fed to present successive end portions to the work engaging tools, a swing stock stop, means for moving the stop into operating position during each feeding movement of the bar to position the end portion with relation to the tools, a guideway in alignment with the spindle, a feed slide having a forward and return movement to move a new piece of stock along the guideway into the spindle, a rack bar movable to stop the machine and cause the feed slide to insert a new bar in the spindle, a pawl continuously oscillated in timed relation to the feeding movement imparted to the bar to impart a step by step feeding movement to the rack bar, a lock bolt actuated by the rack bar to hold the swing stop out of operating position, and means actuated by the advancing movement of the feed slide to withdraw the lock bolt.

37. A machine for fashioning articles successively from bar stock having, in combination, a feed-tube through which a bar is fed to present successive portions to the work engaging tools, actuating mechanism for the feed-tube, a guideway in alignment with the feed-tube, and mechanism controlled from the old bar acting automatically upon exhaustion of the old bar to advance a new piece of stock along the guideway to eject the waste end of the old bar and position the new piece of stock in the feed-tube.

38. A machine for fashioning articles successively from bar stock having, in combination, means for feeding bar stock to present successive portions to the work engaging tools, a main driving clutch, a magazine for storing additional stock, mechanism for selecting from the magazine and inserting in the feed mechanism a new piece of stock, and mechanism rendered active upon exhaustion of a bar to disengage the driving clutch and to cause the mechanism to select and insert a new bar in the feed mechanism and eject the waste end of the old bar.

39. A machine for fashioning articles successively from bar stock having, in combination, a hollow spindle including a feed-tube for feeding a bar to present successive end portions to the work engaging tools, a guideway in alignment with the feed-tube, a feed slide having a feeding and return movement for moving a new piece of stock on the guideway into the spindle, a trip mechanism rendered operative by the passing of the end of the bar, a rack bar movable to cause the feed slide to act to place a new bar of stock in the machine, a pawl rendered operative by the trip mechanism to impart a step by step movement to the rack bar, a latch mechanism for causing the rack bar to be moved with the feed slide on the returning movement of the latter, and means for holding the pawl out of engagement with the rack teeth during the returning movement of the rack bar.

40. A machine for fashioning articles successively from bar stock having, in combination, a hollow spindle including a feed-tube for feeding a bar to present successive end portions to the work engaging tools, a guideway in alignment with the feed-tube, a feed slide having a feeding and return movement for placing a new piece of stock from the guideway in the spindle, a trip mechanism comprising a drop lever normally supported by the bar and rendered operative by the passing of the end of the bar, a rack bar movable to cause a new piece of stock to be placed in the machine by said feed slide, a pawl continuously oscillated in timed relation to the feeding movement imparted to the bar to impart a step by step movement to the rack bar, a lever controlled by the drop lever normally to hold the pawl out of engagement with the rack bar and actuated by the drop lever to release the pawl, mechanism rendered active during the return movement of the feed slide to return the rack bar to starting position and an arm adapted during the return movement of the feed slide to cause the lever to hold the pawl out of engagement with the rack teeth.

41. A machine for fashioning articles successively from bar stock having, in combination, a hollow spindle through which a bar is fed to present successive end portions to the work engaging tools, a drop lever supported by the bar, a guideway in alignment with the spindle, means for automatically moving a new piece of stock along the guideway into the spindle, mechanism rendered active by the falling of the drop lever upon the exhaustion of the bar to cause the drop lever to be raised, and a new bar of stock to be moved along the guideway into the spindle.

42. A machine for fashioning articles successively from bar stock having, in combination, a feed-tube for feeding a bar of stock to present successive portions to the work engaging tools, a guideway in alignment with the feed-tube, a magazine for storing additional stock mounted above the guideway, mechanism for selecting from the magazine and placing in the guideway a new piece of stock, mechanism for moving the new piece of stock lengthwise into the feed-tube, a drop lever normally supported by the bar, a timing mechanism actuated as the end of the bar passes from under the drop lever, said mechanism comprising a rack bar movable to render active the mechanism for selecting a new piece of stock from the magazine and feeding it into the machine, means actuated by the selecting mechanism to raise the drop lever to permit the new bar to be passed under it into the feed-tube, and a latch support on the rack bar to hold the drop lever in raised position.

43. A machine for fashioning articles successively from bar stock having, in combination, means for feeding bar stock to present successive portions to the work engaging tools, a magazine for storing additional stock, mechanisms for selecting and inserting in the feed mechanism a new piece of stock, a feeler mechanism for detecting the exhaustion of the bar, and mechanism controlled by the feeler mechanism acting when thrown into operation to stop the machine, cause the selecting mechanism to place a new piece of stock in the machine, start the machine again, and finally return said inserting mechanism to its original position.

44. A machine for fashioning articles successively from bar stock having, in combination, a hollow spindle through which a bar is fed to present successive portions to the work engaging tools, a guideway in alignment with the spindle, a feed slide for advancing a new piece of stock along the guideway into the spindle, a feeler mechanism for detecting the exhaustion of the bar, and mechanism controlled by the feeler mechanism acting when thrown into operation to stop the machine, cause the feed slide to be advanced to place a new piece of stock in the machine, start the machine again, and finally return the feed slide to its original position.

45. An automatic screw machine having, in combination, a feed-tube for feeding a bar to present successive portions to the work engaging tools, mechanism for feeding a new bar of stock into operative position in the feed-tube, a trip mechanism actuated by the passing of the end of the old bar, and a timing mechanism rendered active by the trip mechanism to cause the feeding mechanism to place a new bar in the feed-tube after the old bar has been exhausted.

46. A machine for fashioning articles successively from bar stock having, in combination, a rotary spindle through which a bar is fed to present successive portions to the work engaging tools and adapted to impart a rotary movement to the bar while engaged by the tools, a work rest for supporting the bar along its length, fingers to confine the bar in the work rest while rotating, and mechanism acting when rendered active to place a new bar in the work rest in a position to be engaged by the said feeding mechanism.

47. A machine for fashioning articles successively from bar stock having, in combination, a rotary spindle through which a bar is fed to present successive portions to the work engaging tools, and adapted to impart a rotary movement to the bar while engaged by the tools, a work rest for supporting the bar along its length, means for confining the bar in the work rest while rotating, adapted to permit the insertion of a new bar laterally into the work rest, and mechanism acting when rendered active to place a new bar in the work rest in a position to be engaged by the said feeding mechanism.

48. A machine for fashioning articles successively from bar stock having, in combination, a rotary spindle through which a bar is fed to present successive portions to the work engaging tools, and adapted to impart a rotary movement to the bar while engaged by the tools, a work rest to support the bar along its length in line with the spindle while rotating, a magazine for storing additional stock, and mechanism rendered operative by the exhaustion of an old bar to place a new bar on the work rest and move it into feeding position.

49. A machine for fashioning articles successively from bar stock having, in combination, a rotary spindle through which a bar is fed to present successive portions to the work engaging tools and adapted to impart a rotary movement to the bar while engaged by the tools, a work rest constructed to confine the bar along its length in line with the spindle while rotating, a magazine for storing additional stock, and means controlled from the old bar for automatically placing in the feed mechanism a new piece of stock upon exhaustion of the old bar.

50. A machine for fashioning articles successively from bar stock having, in combination, means for feeding bar stock to present successive portions to the work engaging tools, a rack bar, a pawl oscillated in timed relation to the movements of the stock feeding means, means acting normally to hold the pawl out of engagement with the rack bar, means rendered operative by the exhaustion of a piece of stock to release the pawl and advance the rack bar, and means actuated by the rack bar to stop the machine.

51. A machine for fashioning articles successively from bar stock having, in combination, means for feeding a bar to present successive end portions to the work engaging tools, a drop lever supported by the bar, and a timing mechanism controlled by the drop lever and acting in timed relation to the feeding movements imparted to the bar to cause the machine to stop when the old bar becomes exhausted.

52. A machine for fashioning articles successively from bar stock having, in combination, means for feeding a bar to present successive end portions to the work engaging tools, a drop lever supported by the bar, a timing mechanism controlled by the drop lever to cause the machine to stop when the old bar becomes exhausted, said mechanism comprising a rack bar movable to stop the machine, a pawl continuously oscillated in timed relation to the feeding movement imparted to the bar of stock, and means actuated by the drop lever to cause the pawl to engage the rack bar and impart a step by step feeding movement thereto.

53. A machine for fashioning articles successively from bar stock having, in combination, means for feeding bar stock to present successive portions to the work engaging tools, a stock stop against which the bar is fed, means for intermittently moving the stock stop into operating position during each feeding movement of the bar to position the end portion with relation to the tools, and mechanism acting when rendered operative to insert a new bar into the machine and to hold the stock stop out of its normal operating position to permit the ejection of the waste end of the old bar by the leading end of a new bar.

54. A machine for fashioning articles successively from bar stock having, in combination, means for feeding bar stock to present successive portions to the work engaging tools, a magazine for storing additional stock, a stock stop against which a bar is fed, means for intermittently moving the stock stop into operating position during each feeding movement of the bar to position the end portion with relation to the tools, and mechanism rendered active upon exhaustion of a bar to insert a new bar in the feeding means from the magazine and to hold the stock stop out of its normal operating position to permit the ejection of the waste end of the old bar by the leading end of the new bar.

55. A machine for fashioning articles successively from bar stock having, in combination, means for intermittently feeding successive portions of a bar through the machine and mechanism controlled from the old bar automatically to place a new bar in the machine timed to operate only upon the exhaustion of the old bar.

In testimony whereof I have signed my name to this specification.

CHARLES A. RICH.